US005771289A

United States Patent [19]

Kuzma

[11] Patent Number: 5,771,289
[45] Date of Patent: Jun. 23, 1998

[54] METHOD AND APPARATUS FOR TRANSMITTING ELECTRONIC DATA USING ATTACHED ELECTRONIC CREDITS TO PAY FOR THE TRANSMISSION

[75] Inventor: Andrew Kuzma, Portland, Oreg.

[73] Assignee: Intel Corporation, Santa Clara, Calif.

[21] Appl. No.: 858,329

[22] Filed: May 19, 1997

Related U.S. Application Data

[63] Continuation of Ser. No. 468,346, Jun. 6, 1995, abandoned.

[51] Int. Cl.⁶ ............................................ H04L 9/00
[52] U.S. Cl. ........................ 380/23; 380/49; 380/51; 705/401; 705/400
[58] Field of Search .................... 380/4, 23, 24, 380/25, 49, 51; 340/825.35; 348/5.5; 364/464.11–464.21; 379/91, 111, 114, 144; 358/402, 407; 705/400–418

[56] References Cited

U.S. PATENT DOCUMENTS

| | | | |
|---|---|---|---|
| 4,517,412 | 5/1985 | Newkirk et al. | 379/123 |
| 4,725,718 | 2/1988 | Sansone et al. | 235/495 |
| 4,757,537 | 7/1988 | Edelmann et al. | 380/51 |
| 4,775,246 | 10/1988 | Edelmann et al. | 380/23 |
| 4,831,555 | 5/1989 | Sansone et al. | 395/113 |
| 4,864,618 | 9/1989 | Wright et al. | 380/51 |
| 4,868,758 | 9/1989 | Kokubu | 364/464.01 |
| 4,934,846 | 6/1990 | Gilham | 400/104 |
| 4,949,381 | 8/1990 | Pastor et al. | 380/51 |
| 5,136,632 | 8/1992 | Bernard | 379/91 |
| 5,138,650 | 8/1992 | Stahl et al. | 379/61 |
| 5,233,657 | 8/1993 | Gunther | 380/23 |
| 5,291,554 | 3/1994 | Morales | 380/5 |
| 5,319,562 | 6/1994 | Whitehouse | 364/464.03 |
| 5,325,431 | 6/1994 | Naruse | 380/16 |
| 5,390,251 | 2/1995 | Pastor et al. | 380/21 |
| 5,401,943 | 3/1995 | Dietrich et al. | 235/375 |
| 5,504,808 | 4/1996 | Hamrick, Jr. | 379/144 |
| 5,508,817 | 4/1996 | Kunigami | 458/402 |
| 5,511,114 | 4/1996 | Stimson et al. | 379/114 |

OTHER PUBLICATIONS

Correspondence dated Apr. 7, 1995 concerning USPS conference.

*Primary Examiner*—Thomas H. Tarcza
*Assistant Examiner*—Pinchus M. Laufer
*Attorney, Agent, or Firm*—Duane, Morris & Heckscher LLP

[57] ABSTRACT

A method and apparatus for transmitting electronic messages wherein payment is required for the transmission. Payment is made as messages are transmitted using previously obtained electronic stamps or credits. An electronic sender obtains in advance the electronic stamps which are usable to pay for the transmission. Electronic stamps are represented by a signal which is transmitted with the message and must be present for transmission to occur. The encoded signal preferably includes authenticating data. The balance of electronic stamps available is debited as stamps are used and incremented as they are obtained. The value of stamps necessary to pay for a transmission can vary according to the data content of the electronic message and the invention therefore preferably examines the data content of the message and encodes the proper electronic stamp amount. The invention also preferably alters the encoded signal representing the stamps which have been used for transmission to prevent further use of the signal as payment for another transmission. The electronic message preferably is encrypted prior to transmission and decrpyted when it is received by an electronic addressee.

24 Claims, 5 Drawing Sheets

METHOD AND APPARATUS FOR TRANSMITTING ELECTRONIC DATA USING ATTACHED ELECTRONIC CREDITS TO PAY FOR THE TRANSMISSION

This application is a continuation of application Ser. No. 08/468,346 filed on Jun. 6, 1995, which is now abandoned.

BACKGROUND OF THE INVENTION

1. Field of the Invention

The invention relates to the field of electronic data transmission and more particularly to a method and apparatus for paying for the transmission.

2. Description of the Related Art

Electronic data transmission is known. For example, it is known that remote devices, such as computers and telefax machines can transmit and receive data over telecommunications networks. Such networks can be standard telephone lines, satellite transmission paths, digital microwave radio links, optical fibers or digital data transmission lines. They include local or wide area configurations. The communication channels can be provided by the owners of the network but more typically are leased from a common carrier, i.e. the telephone company. A modern network may consist of thousands of computing devices made by various manufacturers connected by a variety of transmission media spanning international and intercontinental boundaries.

Data transmission often is in the form of what is known as electronic mail. Electronic mail may be transmitted by means of point-to-point systems or computer based message systems.

Point-to-point systems link two specific terminals together for the duration of the transmission, and include telegrams, mailgrams, TELEX, TWX, and telefax.

Computer-based message systems store messages in a computer database for later retrieval. Computer-based messaging is not location bound and may take place on a single computer, a network of computers, or across different-linked computer networks. Computer-based message systems allow users to broadcast to many users, read and discard messages, file and retrieve messages, move messages to and from the messaging system and forward messages.

As noted, the electronic mail systems described above typically rely on third-party owned communication channels. These channels are leased from the carrier for a given amount over a predetermined period of time or the user is billed for any use at a later date similar to the billing by a telephone company for use of its lines to complete a telephone call. The cost efficiency of the pre-paid lease method depends on the amount of use the lessor makes of the communication channels. In times where use is down, the lessee will be paying for goods and services it is not using.

Payment based on billings for actual use of the communications channel might be more economical, however, such a method requires that use be accurately tracked and bills prepared and sent by the carrier. The user must respond to the carrier's bills by paying the bills within a short period of time. It therefore is desirable to provide a system for pre-paid electronic message transmission where payments are directly proportional to use.

The United Sates Postal Service (USPS) has established the paradigm for prepaid message transmission, albeit in hard-copy, rather than electronic form. The USPS sells stamps of predetermined denominations which the USPS then recognizes as payment for its transmission, i.e. physical carrying, of the message from sender or post office to recipient or remote post office box. In more detail, after preparing a written message, a sender typically places the message in a protective carrier, such as an envelope, to protect it in its physical travel through the mail. The envelope further provides a measure of security and confidentiality by obscuring the text of the message from unintended recipients. The sender then determines the weight of the message and envelope and affixes sufficient postage, in the form of pre-purchased stamps, to comply with USPS regulations, which make weight determinative of postage amount.

The sender places the letter into the USPS system by placing it in a mailbox or delivering it to a local office of the USPS. The USPS checks the stamp(s) for authenticity and proper amount, and cancels it by indelibly marking it. After the postage has been checked and canceled, the letter is delivered to the intended recipient at the address printed on the envelope, such as to recipient's home or place of business or a post office box proximal to the recipient.

The USPS, therefore, provides a system for hard-copy message delivery in which the delivery service is paid for as it is used and in an amount proportional to the size of the message to be delivered.

SUMMARY OF THE INVENTION

It is an object of the invention to provide a method and apparatus for paying for transmission of electronic data substantially concurrently with the transmission.

It is a further object of the invention to provide a method and apparatus for acquiring electronic stamps usable as payment for the transmission of an electronic message.

It is a further object of the invention to attach the electronic stamps to an electronic message thereby providing payment for the transmission of the message.

Another object of the invention is to mark the electronic stamps after they have been used to identify them as having been used to pay for the transmission of an electronic message.

These and other objects are achieved by the method of the invention wherein a sender obtains, for example by purchasing, electronic stamps, for example, from a transmission service or carrier which provides one or more communications links for use by the sender to transmit electronic data to an addressee. A database or counter preferably is updated to reflect an addition to the sum of electronic stamps owned by the sender when the stamps are obtained or purchased. The database or counter preferably is accessible by both the sender and the transmission service to enable each to check the total electronic postage amount available to the sender.

The transmission service typically provides communications links between the sender and an addressee. The sender uses the electronic stamps to pay for the transmission of the message and use of the communications links. After preparing an electronic message for sending and selecting an addressee, for example by designating an address in the address block of a message template for a computer-based messaging system, or dialing a phone number corresponding to a remote telefax machine, a sender typically begins transmission by depressing a "SEND" key or the like. The invention at this point examines the file size, for example in bytes, of the data being transmitted and attaches an electronic stamp to the data transmission as payment for transmission and/or use of the communications channel. The electronic stamp preferably is a data packet that when processed by the carrier or at the addressee location appears as a stamp-like graphic marking on the transmitted document. Substantially concurrently with application of the electronic stamp to the electronic data, the counter or database containing the data corresponding to the sender's amount of electronic stamps is debited in an amount equal to the value of the affixed electronic stamp to reflect the use of the electronic stamp to pay for the electronic transmission of the data or message.

Also preferably substantially concurrently with the transmission of the data, the electronic stamp or stamp is "canceled" to prevent its further, fraudulent use. The cancellation mark preferably shows that the carrier has received the letter and that the electronic stamp has been accepted for transmission of the data. The cancellation mark also can identify the date and time the data was sent.

To prevent fraud and theft of the services of the carrier, the carrier must have a method for authenticating a stamp presented as payment for a transmission. There are a few possibilities available for authenticating stamps.

One option is to hide an authenticating mark in the stamp graphics. For example, the stamp can appear as a small block of graphics somewhere within the boundaries of the message being transmitted. The graphics can include an authenticating pattern, preferably invisible to the naked eye. In this embodiment, all message transmissions should be routed through an office or station of the carrier, much like U.S. mail is routed through a branch of the USPS. The electronic carrier can look for the special graphics in the stamp at its branch office or station by using a viewer specially designed for viewing the pattern, which as noted above is invisible to the naked eye. If the special graphics or pattern is not visible, the carrier will know that the stamp is a forgery and can refuse to transmit the message.

Another method of authentication is accomplished electronically. The stamp typically is a small data packet having a number of bytes of code. It is desirable to include with the stamp graphics data an authentication data code. A special device, for example at a station of the electronic carrier through which the message passes, "investigates" the electronic stamp for the presence of the authentication code. The carrier can refuse to transmit any electronic message in which the authentication code is not found.

DETAILED DESCRIPTION OF THE INVENTION

The invention is an apparatus and method for transmitting electronic data wherein payment is made for the transmission. Electronic stamps or credits are obtained and are affixed to the transmitted data as payment for the transmission. A carrier or other entity primarily responsible for the transmission accepts the electronic credits as payment. The electronic message can be encrypted to prevent it from being read by anyone but an addressee. The size of the electronic message is examined to determine the amount of electronic stamps which must be affixed as payment for the transmission.

Figure 1:
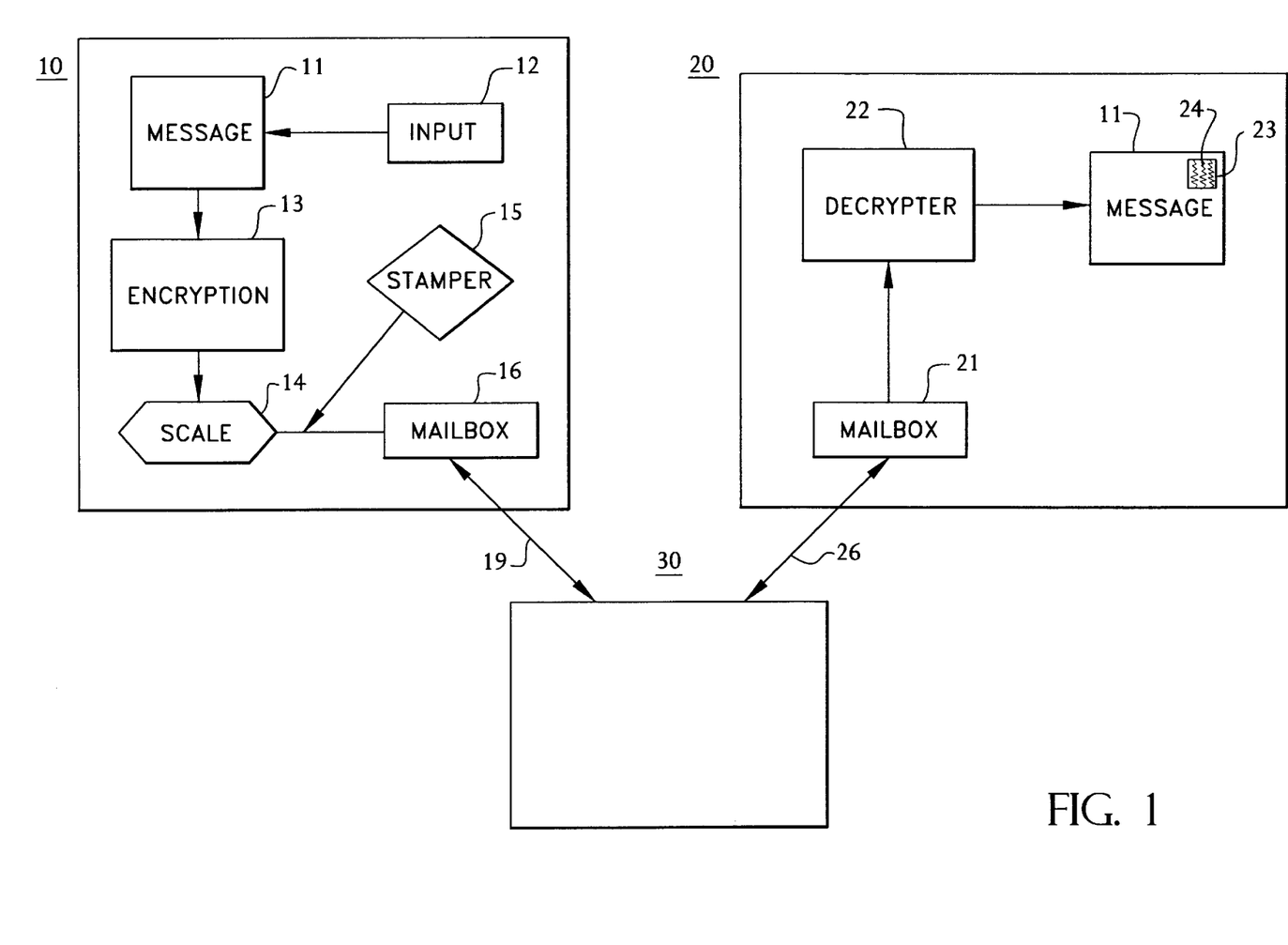
FIG. 1 is a block diagram of a general embodiment of the invention.

A block diagram of a general embodiment of the invention is shown in FIG. 1. Electronic message 11, represented by data to be transmitted, is sent from sender terminal 10 for eventual receipt at addressee terminal 20. Sender terminal 10 and addressee terminal 20 preferably are processor controlled. Electronic message 11 preferably is an electronic mail message. Electronic message 11 can be designed for point-to-point transmission, e.g. between two linked terminals such as the type used for transmitting telegrams, mailgrams, TELEX, TWX and telefax. Sender terminal 10 can include therefore data input device 12 for inputting the text of the telegram, mailgram, TELEX, TWX or telefax. Electronic message 11 also can be associated with a computer-based messaging system of the type wherein messages are transmitted between linked personal computers. In such a case, input device 12 is, for example, a keyboard or optical scanner.

Electronic message 11, input by data input device 12 is then encrypted by encryption device 13. Encryption device 13 simulates placing message 11 into an envelope to obscure the text of the message, thereby rendering it unreadable except at addressee terminal 20.

After message 11 has been encrypted, it is "weighed" by scale 14. Scale 14 "weighs" the message to determine the amount of electronic postage required. However, the electronic message cannot be "weighed" in the conventional sense, but instead is examined for file size or number of bytes. The electronic postage required can be scaled, similar to what is done by the USPS. For example, an electronic message having O-N bytes would require X postage, one having N+1 to 2N bytes would require 2X postage and so on.

In any event, after scale 14 measures the amount of electronic postage necessary, stamper 15 affixes an appropriately valued electronic stamp or credit to electronic message 11. Electronic stamp 15 is data recognized by electronic post office 30 as payment for transmission of electronic message 11. Moreover, the data can include encoded graphics that when decoded provide an image of a president, other famous person or famous scene, much like a USPS stamp.

After affixation of stamp 15, the stamped, encrypted electronic message 11 is placed in output mailbox 16, from where it is subsequently transmitted to electronic post office 30 over line 19. Electronic post office 30 also can be processor controlled.

Electronic post office 30 transmits electronic message 11 to mailbox 21 at addressee location 20 over line 26. Electronic post office 30 can own lines 19 and 26 or can lease them from, for example, a telephone company or other communications service. Lines 19 and 26 can be wire cables, fiber optic cables, microwave or satellite links, or any other devices known for carrying signals from point-to-point. Mailbox 21, especially in the case of computer-based messaging, can be a memory location or the like in which electronic message 11 is stored prior to its opening at addressee location 20. In point-to-point messaging systems, mailbox 21 can be, for example, a receiving device such as a telefax machine. At addressee location 20, the electronic message 11 is decrypted, by decrypter 22, much like a conventional USPS letter is received in an envelope which is opened by the addressee. After decryption, electronic message 11 is displayed in text and/or graphics form from which it can be read/viewed by the addressee.

The electronic message 11 displayed at addressee location 20 can include graphics denoting electronic stamp 23. Since electronic stamp 23 has been used to pay for electronic transmission of electronic message 11, electronic stamp 23 bears cancellation marks 24 when viewed at addressee location 20. Cancellation marks 24 can be any sort of graphics which generally will be understood to stand for the fact that the electronic stamp has been canceled.

Figure 2:
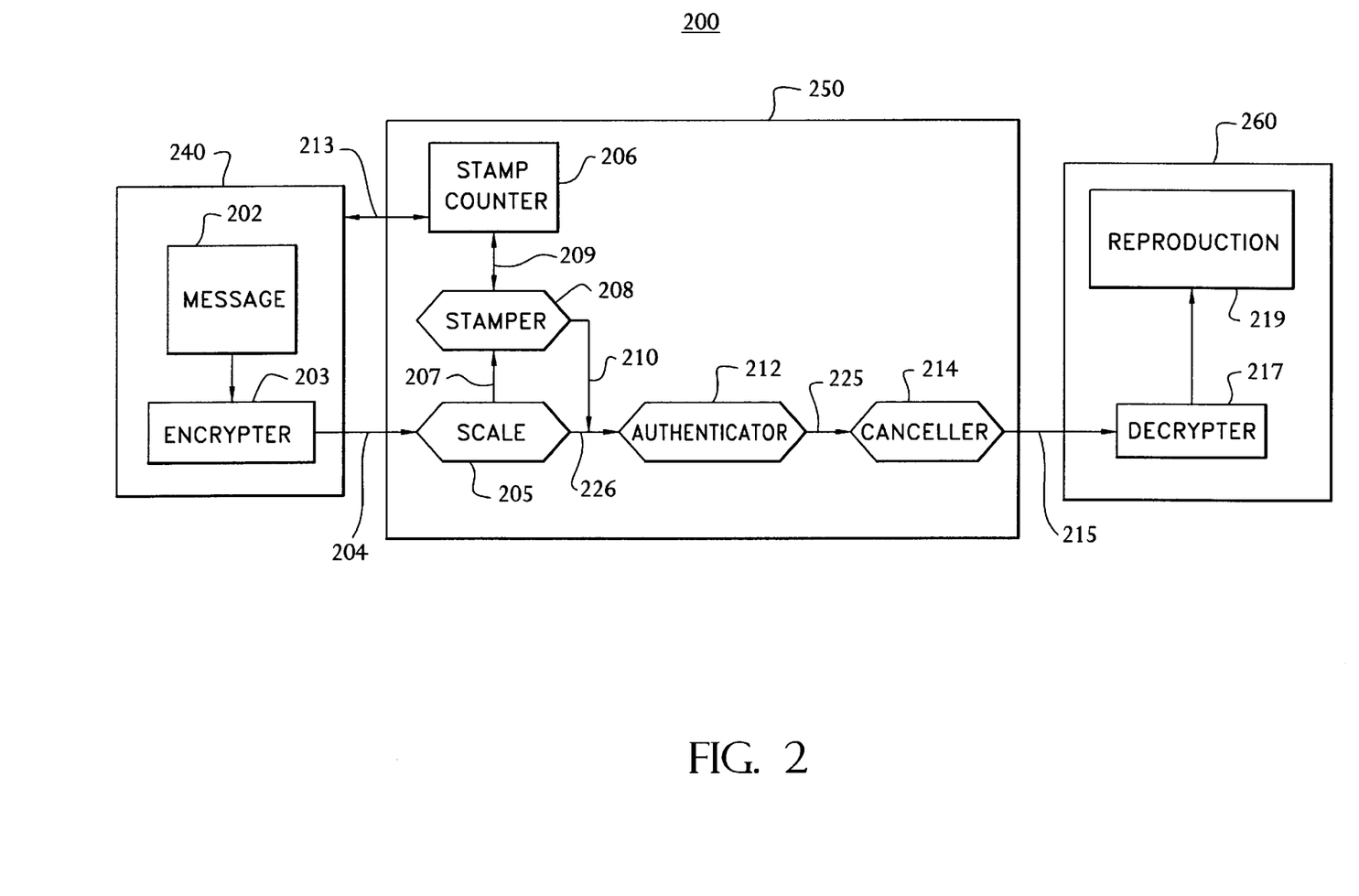
FIG. 2 is a block diagram of another embodiment of the invention.
Figure 3:
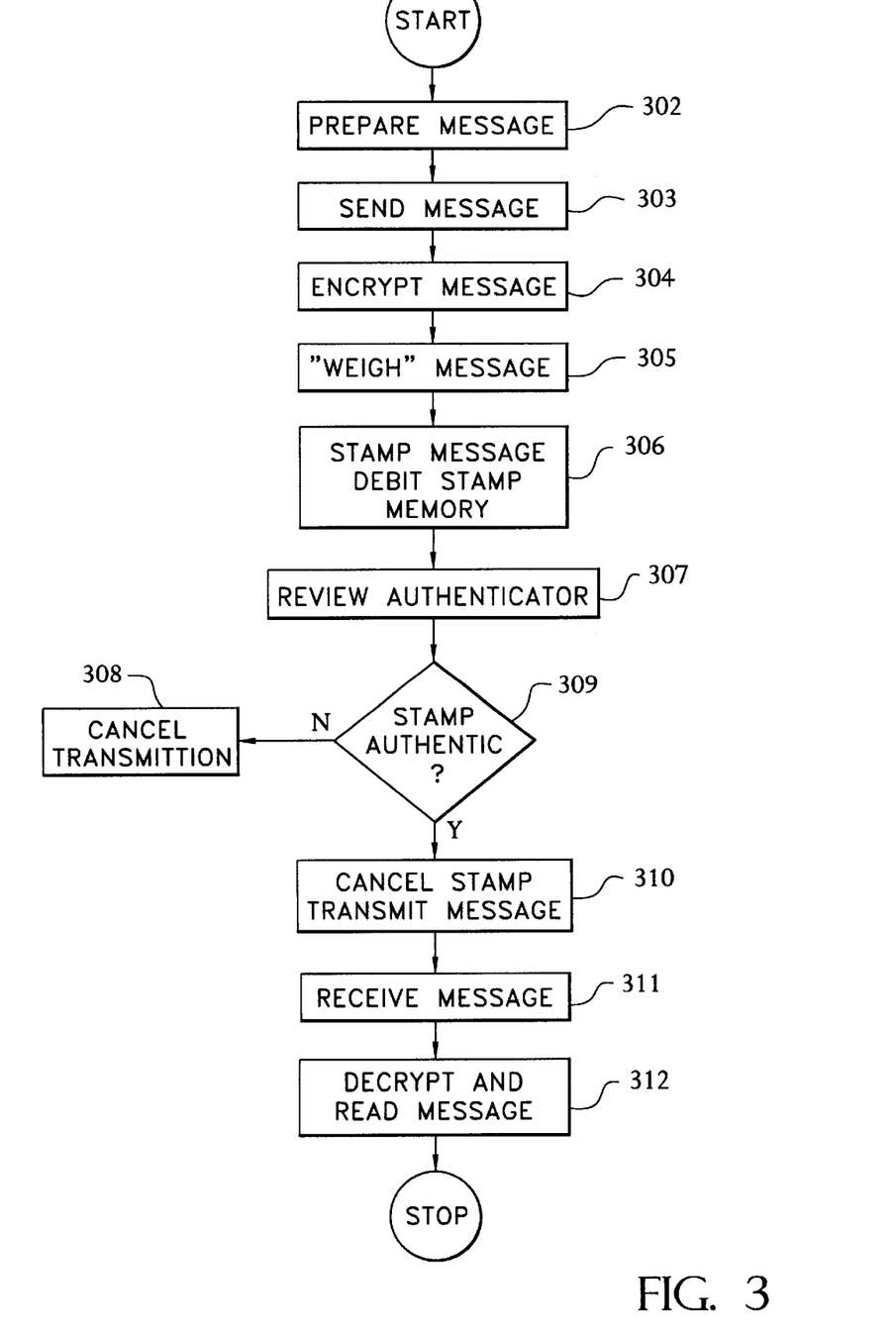
FIG. 3 is a flow chart corresponding to the embodiment of FIG. 2.

A detailed overview of another embodiment of the invention is shown in FIGS. 2, 3 and 4. As shown in FIG. 2, an electronic message 202 is prepared (step 302 of FIG. 3) in the case of computer based messaging, or input, in the case of point-to-point communications, using conventional means known to those skilled in the art. After preparation of electronic message 202, electronic sender 240 takes steps to transmit (step 303 of FIG. 3) message 202, typically by closing a switch at electronic sender location 240. Electronic message 202 is encrypted (step 304 of FIG. 3) by encrypter 203 before transmission over line 204 to electronic post office 250. Upon receipt at electronic post office 250, the data size of electronic message 202 is examined (step 305 of FIG. 3) by scale 205 to determine the size of electronic message 202, such as in number of bytes. Scale 205 is coupled to electronic stamper 208 through line 207. Electronic stamper 208 is coupled to electronic stamp counter 206 through line 209. Electronic stamp counter 206 includes data reflecting the balance of electronic stamps available to electronic sender 240.

Scale 205 determines the amount of electronic postage required according to the size of electronic message 202. Scale 205 informs electronic stamper 208 of the value of electronic postage required. Electronic stamper 208 simultaneously accesses electronic stamp counter 206 to determine whether electronic sender terminal 240 owns enough electronic postage to cover the amount required for the transmission of electronic message 202. Assuming electronic stamp counter 206 includes data reflecting that sufficient electronic postage is available, electronic stamper 208 will affix (step 306 of FIG. 3) an encoded electronic stamp having the necessary value to encrypted electronic message 202, for example, through line 210. Electronic stamper 208 also will alter the data in electronic stamp counter 206 to debit the amount of electronic postage available to electronic sender 240 in an amount equal to the electronic postage just applied to encrypted message 202. Electronic sender terminal 240 also can access electronic stamp counter 206 to monitor the amount of electronic postage it has available.

Figure 4A:
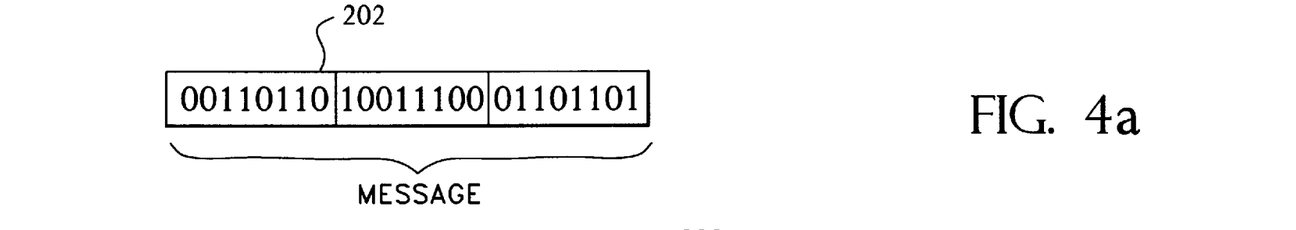
FIGS. 4a–d are a representation of the electronic message and electronic stamp.
Figure 4B:
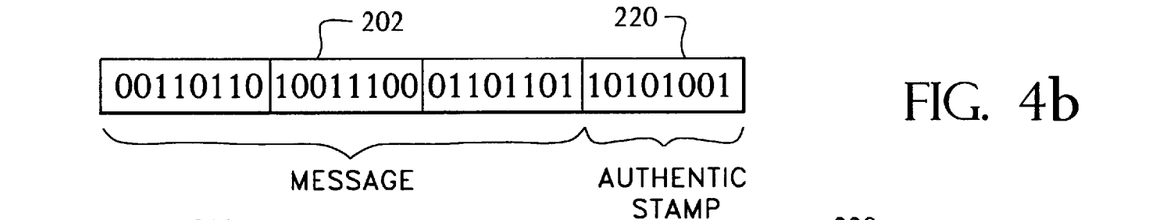

FIG. 4a is a representation of electronic message 202. Electronic stamp 220 is a packet of data preferably affixed to the data of electronic message 202 as shown in FIG. 4b. Electronic stamp 220 preferably is a header or part of a header to the electronic message 202 and contains the data instructing electronic post office 250 that electronic message 202 should be transmitted. Electronic stamper 208 also preferably inserts a unique code into electronic stamp 220 for authenticating electronic stamp 220 for reasons to be explained below.

Electronic post office 250 has an interest in ensuring that the electronic stamp 220 is legitimate and has been rightfully purchased or obtained from electronic post office 250 (or its controlling entity) to pay for use of its hardware, software and services associated with transmission of electronic message 202. Electronic post office 250, therefore, preferably checks electronic stamp 220 for authenticity prior to transmitting electronic message 202.

Authenticator 212 examines (step 307 of FIG. 3) the authenticating code in electronic stamp 220 to ensure that electronic stamp 220 is legitimate, i.e., not a forgery and not been previously used or canceled. The authenticating code could include code identifying it as an electronic stamp provided by electronic post office 250 and could include an identifier for associating it with a particular electronic sender 240. The latter feature prevents users of the system 200 from, mistakenly or otherwise, transmitting electronic messages 202 using another user's legitimate electronic stamps 220. The authentication code must be proprietary to electronic post office 250 for obvious reasons and preferably is regularly changed to prevent its discovery by those who would fraudulently use system 200 for transmission of electronic messages. As shown in FIG. 3, if authenticator 212 discovers that electronic stamp 220 is unauthentic, i.e. contains no or an incorrect authentication code, or has been canceled, electronic post office 250 will cancel (step 308 of FIG. 3) transmission of electronic message 202. Preferably, any electronic sender 240 that attempts to transmit an electronic message 202 using a fraudulent electronic stamp is identified and dealt with accordingly.

Figure 4C:
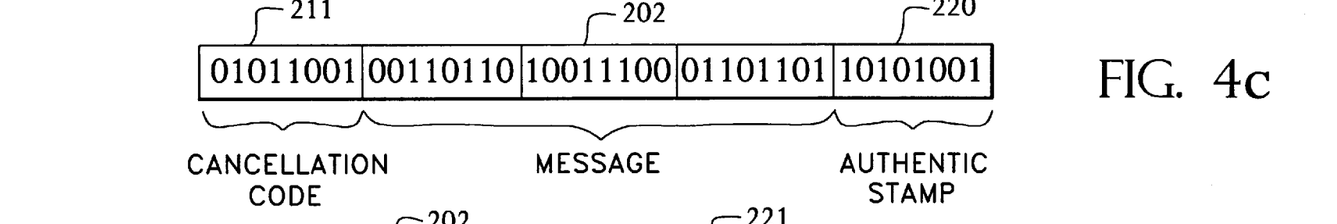
Figure 4D:
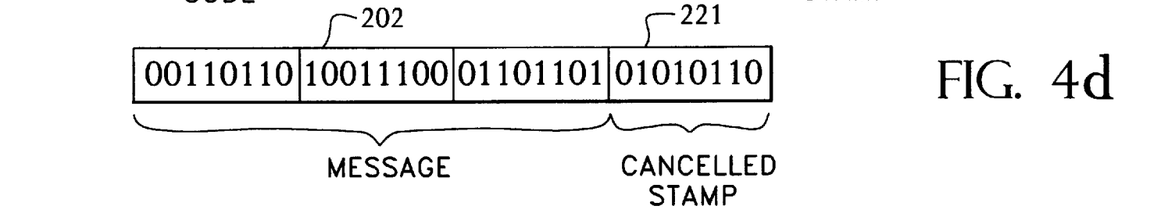

After authentication of electronic stamp 220 by authenticator 212 (step 309 of FIG. 3), electronic stamp 220 must be canceled, for example to prevent its further use. Cancellation is performed by canceler 214 (step 310 of FIG. 3). Canceler 214 adds cancellation code 211 as shown in FIG. 4c, which identifies the stamped message as having been canceled. Alternatively, as shown in FIG. 4d, canceler 214 alters, deletes or replaces the data of electronic stamp 220 such that it becomes unrecognizable by electronic post office 250 as a valid electronic stamp 220 or is recognized as a stamp which once was valid but which has been canceled and is unusable to pay for the transmission of electronic message 202. If altering data, canceler 214 must sufficiently alter the data of electronic stamp 220 such that, for example, electronic addressee 260 is unable to reconstruct or modify it back into a valid electronic stamp having accurate authentication data. In cases where a cancellation code is added or stamp data is altered or replaced, the cancellation data should include graphics which provide visual indication of cancellation.

After cancellation of electronic stamp 220, encrypted electronic message 202 is transmitted by electronic post office 250 to electronic addressee 260 through transmission line 215. Transmission line 215 can be any transmission path operable for carrying data such as a wire or fiber optic cable, or microwave or satellite link. Transmission line 215 can be shared or dedicated to coupling electronic sender 240 to electronic addressee 260 through electronic post office 250.

Electronic addressee 260 receives (step 311 of FIG. 3) electronic message 220, opens or decrypts message 220 using decrypter 217 and displays and/or prints electronic message 220 (step 312 of FIG. 3) on reproduction device 219, which according to the invention can be a monitor, printer, telefax machine, TELEX machine or other such device known in the art to display or print data.

Figure 5:
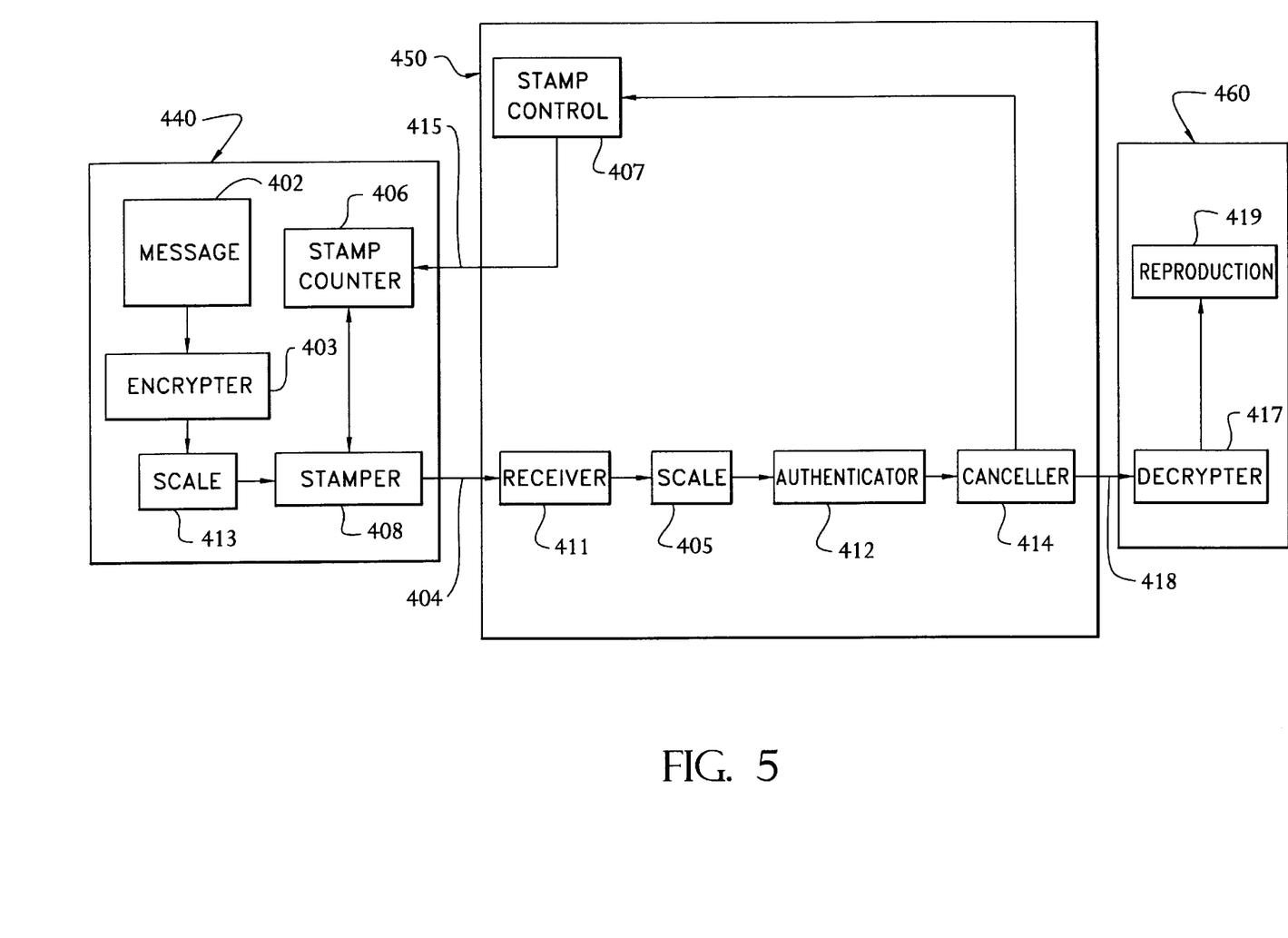
FIG. 5 is a block diagram of yet another embodiment of the invention.

FIG. 5 shows another of the many embodiments of the invention. In FIG. 5, electronic sender terminal 440 is operable to accept/prepare electronic message 402 for encryption by encrypter 403 and eventual transmission through line 404 to receiver 411 at electronic post office 450. However, in the embodiment shown in FIG. 5, electronic sender location 440 includes a resident electronic stamp counter 406 for storing the amount of electronic stamps available at electronic sender terminal 440.

Also resident at electronic sender terminal 440 is scale 413 and electronic stamper 408. Therefore, in the embodiment of FIG. 5, an electronic message is "weighed", i.e. its file size examined and the electronic stamps 420 are applied at electronic sender location 440 rather than at electronic post office 450. This more closely follows the paradigm established by the USPS for transmission of a hard copy document where postage is applied to an envelope prior to it being submitted to the USPS for delivery.

In the embodiment of FIG. 5, electronic stamper 408 must be isolated from access by the user at electronic sender terminal 440. More particularly, the user must be prevented from learning of the stamp and authentication code generated by stamper 408 to prevent fraudulent generation of stamps. Similarly, electronic stamp counter 406 must be inaccessible by a user at electronic sender terminal 440 to prevent the user from increasing the amount of electronic postage available without paying for it. In this respect, electronic stamp counter 406 is coupled to stamp control 407 at electronic post office 450. Only electronic post office 450 can increment electronic stamp counter 406 through line 415 to increase the amount of electronic postage available, such as when it has been legitimately purchased from electronic post office 450.

As shown in FIG. 5, stamper 408 is bidirectionally coupled to electronic stamp counter 406 so that stamper 408 can confirm that electronic stamp counter 406 includes sufficient postage to complete a transmission.

Encrypted, stamped electronic message 402 is received at electronic post office 450 at receiver 411. Receiver 411 is coupled to scale 405 which determines the data content of electronic message 402. Scale 405 is operable to verify that a sufficient amount of postage was applied by electronic stamper 408. If insufficient postage is detected by scale 405, electronic sender location 440 preferably is notified and provided an opportunity to add postage and retransmit electronic message 402.

Scale 405 preferably transmits electronic message to authenticator 412 and canceler 414 for authentication checking and electronic stamp cancellation as described above with reference to FIG. 2. However, in the embodiment of FIG. 5, canceler 414 instructs stamp control 407 to decrement electronic stamp counter 406 at electronic sender location 440 by an amount equivalent to the value of the electronic stamp canceled by canceler 414. Encrypted electronic message 402, which has been stamped, and wherein the stamp has been authenticated and canceled is transmitted to electronic addressee 460 over line 415 where it is decrypted by decrypter 417 and reproduced by reproduction device 419 which again, can be a monitor, printer, telefax, TELEX or other device adapted to visually reproduce electronic messages.

The embodiments described above are just some of the embodiments of the invention evident to a person of ordinary skill relying on the above disclosure. For example, it is within the scope of the invention to combine authenticator 212, 412 and canceler 214, 414 into a single unit which performs the dual tasks of checking an electronic stamp for authentication and canceling the authenticated stamp, as described in more detail above. Furthermore, stamp counter 206,406 can be debited as stamps are applied at a sender terminal 220,420, when canceled by electronic post office 250,450, or at other appropriate times.

In the invention, the electronic post office 250, 450 preferably exercises control over the electronic stamp counter 206,406 whether or not the electronic stamp counter is resident in the electronic post office or elsewhere, to ensure that the counter is debited and incremented at appropriate times, i.e. as stamps are used or canceled, and purchased. It also is within the scope of the invention for the electronic post office to monitor stamp purchases versus stamps used by a particular user to provide an added measure of security. A discrepancy between stamp purchases and stamp uses probably means that a user is fraudulently incrementing the electronic stamp counter so as to acquire postage without paying for it.

As noted above, the electronic stamp preferably is a string of data which is readable, identifiable and accepted by the electronic post office as a method for paying for transmission of the electronic message to which it is attached. In a preferred embodiment, the stamp data, when decoded, for example at electronic addressee 260,460 generates an image, such as a picture of a president or other famous person or a famous event. This follows the paradigm established by the USPS wherein paper stamps are adorned with such images. The stamp data can be decoded immediately upon receipt at electronic addressee location 260,460 or later, such as when the message is decrypted. The decoded stamp data can include decoded cancellation data, added, for example by canceler 214, 414 such that the electronic stamp image bears markings indicating that the electronic stamp has been canceled, as is done by the USPS. The cancellation data added by canceler 214, 414 preferably includes data identifying the date, time and place of cancellation of message 202, 402. Such data, when decoded, can appear across the stamp image generated or, preferably, immediately below the stamp image.

It is within the scope of the invention to include in the stamp graphics a pattern identifying the electronic stamp as legitimate and indicating whether it has been canceled. The graphics can be displayed, i.e. the electronic stamp decoded, at the electronic post office 250,450 and the graphics examined for presence of the pattern identifying the electronic stamp as legitimate. The electronic post office can include a storage device for collecting electronic messages prior to visual examination for stamp authenticity. If the electronic post office identifies an illegitimate stamp through visual examination, an operator at the electronic post office can take steps to cancel transmission of the message. Preferably, the authentication pattern is invisible to the naked eye so that it cannot easily be copied; the electronic post office thereby employing a device which renders the pattern visible.

Various avenues are available for the acquisition of electronic stamps by an electronic sender 240,440. In a straightforward approach somewhat reminiscent of USPS procedures, an electronic sender purchases stamps from electronic post office 250,450 such as by mailing a check, or through the telephone using a credit or bank account debit card. Stamps also can be purchased using computer communications through the established coupling of an electronic sender location to the electronic post office. In any case where an electronic sender 240,440 has obtained electronic stamps from electronic post office 250,450 electronic post office 250,450 updates electronic stamp counter 206, 406 to reflect the increase in postage available to electronic sender 240,440.

The invention is well suited, for example, for providing a method and apparatus for an electronic sender to communicate with an electronic addressee using communications links owned by a third party wherein electronic stamps are purchased, for example using cash, from the third party to pay for use of its equipment and services. However, the invention also is suited for intracompany use to regulate intracompany electronic mail use which, if unregulated could adversely tax the company's electronic mail and/or computer network. In such a scenario, each employee can be provided with an allocation of electronic stamps at predetermined intervals, for example, every month or year, which are debited as the employee makes intracompany electronic message transmissions. An employee which overuses the electronic mail system will exhaust her allocation of stamps and be unable to send electronic messages until her supply is refreshed at the predetermined interval.

It also should be understood that the words "payment" and "pay" are used herein in the broad sense, such as "to discharge an obligation to", which in this case includes exchanging electronic stamps or credits in return for transmission of a message, regardless of whether the electronic stamps or credits have been purchased with cash or obtained in any other manner.

Although encryption of an electronic message 202,402 is preferred, encryption is not necessary for functioning of the invention and the encryption (step 304 of FIG. 3) may be removed from processing.

It will be understood that various changes in the details, materials and arrangements of the features which have been described and illustrated in order to explain the nature of this invention may be made by those skilled in the art without departing from the principle and scope of the invention as expressed in the following claims.

What I claim is:

1. A method for routing an electronic message from a sender terminal to an addressee terminal, comprising the steps of:
   (a) receiving the electronic message from the sender terminal at a routing terminal, wherein the routing terminal verifies and accepts a prepaid electronic stamp attached to the electronic message by the sender terminal as payment by the sender terminal for the transmission; and
   (b) transmitting the electronic message from the routing terminal for delivery to the addressee terminal.

2. The invention of claim 1, wherein step (a) further comprises the step of debiting a supply of electronic stamps for the sender terminal by a value for the electronic stamp and step (b) comprises the step of canceling the transmission of the electronic message if the value for the electronic stamp to be debited exceeds a current balance of the supply of electronic stamps.

3. The invention of claim 1, wherein step (b) further comprises the step of rendering the electronic stamp unusable to pay for transmission of another electronic message.

4. The invention of claim 3, wherein step (b) comprises the step of altering the electronic stamp to render it unusable for the transmission of another electronic message.

5. The invention of claim 3, wherein step (b) comprises the step of adding a cancellation signal to render the electronic stamp unusable for the transmission of another electronic message.

6. The invention of claim 5, wherein the cancellation signal identifies timing information related to the transmission of the electronic message.

7. The invention of claim 1, wherein a value for the electronic stamp is a function of an amount of data in the electronic message and step (b) further comprises the step of examining the electronic message to determine the amount of data in the electronic message and the value of the electronic stamp.

8. The invention of claim 1, wherein the electronic stamp appears at the addressee terminal as comprising graphics.

9. A routing terminal for routing an electronic message from a sender terminal to an addressee terminal, comprising:
   (a) a receiver adapted to receive the electronic message from the sender terminal, wherein the receiver verifies and accepts a prepaid electronic stamp attached to the electronic message by the sender terminal as payment by the sender terminal for the transmission; and
   (b) a transmitter adapted to transmit the electronic message for delivery to the addressee terminal.

10. The invention of claim 9, wherein the receiver is adapted to debit a supply of electronic stamps for the sender terminal by a value for the electronic stamp and the transmitter is adapted to cancel the transmission of the electronic message if the value for the electronic stamp to be debited exceeds a current balance of the supply of electronic stamps.

11. The invention of claim 9, wherein the transmitter is adapted to render the electronic stamp unusable to pay for transmission of another electronic message.

12. The invention of claim 11, wherein the transmitter is adapted to alter the electronic stamp to render it unusable for the transmission of another electronic message.

13. The invention of claim 11, wherein the transmitter is adapted to add a cancellation signal to render the electronic stamp unusable for the transmission of another electronic message.

14. The invention of claim 13, wherein the cancellation signal identifies timing information related to the transmission of the electronic message.

15. The invention of claim 9, wherein a value for the electronic stamp is a function of an amount of data in the electronic message and the receiver is adapted to examine the electronic message to determine the amount of data in the electronic message and the value of the electronic stamp.

16. The invention of claim 9, wherein the electronic stamp appears at the addressee terminal as comprising graphics.

17. A method for sending an electronic message to an addressee terminal via a routing terminal, comprising the steps of:
   (a) attaching a prepaid electronic stamp to the electronic message by a sender terminal; and
   (b) transmitting the electronic message by the sender terminal to a routing terminal, wherein the routing terminal accepts the electronic stamp as payment for transmitting the electronic message for delivery to the addressee terminal.

18. The invention of claim 17, wherein step (a) further comprises the step of debiting a supply of electronic stamps for the sender terminal by a value for the electronic stamp and step (b) comprises the step of canceling the transmission of the electronic message if the value for the electronic stamp to be debited exceeds a current balance of the supply of electronic stamps.

19. The invention of claim 17, wherein a value for the electronic stamp is a function of an amount of data in the electronic message and step (a) further comprises the step of examining the electronic message to determine the amount of data in the electronic message and the value of the electronic stamp.

20. The invention of claim 17, wherein the electronic stamp appears at the addressee terminal as comprising graphics.

21. A sender terminal for sending an electronic message to an addressee terminal via a routing terminal, comprising:
   (a) a message generator adapted to attach a prepaid electronic stamp to the electronic message; and
   (b) a transmitter adapted to transmit the electronic message to a routing terminal, wherein the routing terminal accepts the electronic stamp as payment for transmitting the electronic message for delivery to the addressee terminal.

22. The invention of claim 21, wherein the message generator is adapted to debit a supply of electronic stamps for the sender terminal by a value for the electronic stamp and the transmitter is adapted to cancel the transmission of the electronic message if the value for the electronic stamp to be debited exceeds a current balance of the supply of electronic stamps.

23. The invention of claim 21, wherein a value for the electronic stamp is a function of an amount of data in the electronic message and the message generator is adapted to examine the electronic message to determine the amount of data in the electronic message and the value of the electronic stamp.

24. The invention of claim 21, wherein the electronic stamp appears at the addressee terminal as comprising graphics.

* * * * *